(12) United States Patent
Blanco

(10) Patent No.: US 12,515,938 B2
(45) Date of Patent: Jan. 6, 2026

(54) BEVERAGE DISPENSER, BEVERAGE DISPENSING NOZZLE, AND BEVERAGE DISPENSING METHOD

(71) Applicant: Cylzer S.A., Montevideo (UY)

(72) Inventor: Javier Hernan Blanco, Buenos Aires (AR)

(73) Assignee: CYLZER S.A., Montevideo (UY)

( * ) Notice: Subject to any disclaimer, the term of this patent is extended or adjusted under 35 U.S.C. 154(b) by 337 days.

(21) Appl. No.: 17/913,799

(22) PCT Filed: Mar. 22, 2021

(86) PCT No.: PCT/IB2021/052363
§ 371 (c)(1),
(2) Date: Sep. 22, 2022

(87) PCT Pub. No.: WO2021/191774
PCT Pub. Date: Sep. 30, 2021

(65) Prior Publication Data
US 2024/0208788 A1 Jun. 27, 2024

Related U.S. Application Data

(60) Provisional application No. 62/993,016, filed on Mar. 22, 2020.

(51) Int. Cl.
*B67D 1/00* (2006.01)
*B67D 1/08* (2006.01)
(Continued)

(52) U.S. Cl.
CPC ........... *B67D 1/007* (2013.01); *B67D 1/0026* (2013.01); *B67D 1/0059* (2013.01);
(Continued)

(58) Field of Classification Search
CPC . A23L 2/54; A23L 2/56; B01F 23/236; B67D 1/0046; B67D 1/0048;
(Continued)

(56) References Cited

U.S. PATENT DOCUMENTS 2,510,395 A * 6/1950 Goodrie ................. E03C 1/084
137/888
3,084,718 A * 4/1963 Ash ...................... B67D 1/1466
138/40

(Continued)

FOREIGN PATENT DOCUMENTS

| DE | 70 470 C | 8/1893 |
|---|---|---|
| EP | 0 861 801 A1 | 9/1998 |
| EP | 3 360 844 A1 | 8/2018 |

OTHER PUBLICATIONS

International Search Report mailed Jul. 19, 2021 for International application No. PCT/IB2021/052363.
(Continued)

*Primary Examiner* — Paul R Durand
*Assistant Examiner* — Randall A Gruby
(74) *Attorney, Agent, or Firm* — Lippes Mathias LLP

(57) ABSTRACT

Method, device and nozzle for serving a carbonated beverage. In particular, the invention encompasses the dissolution of a concentrated syrup on a cold-water stream in a mixing ring and at a desired syrup/water ratio, the subsequent carbonation of the dissolution in a carbonation ring at a desired gas/liquid ratio, and the serving of the carbonated beverage through a specially designed serving nozzle that reduces foaming during the serving by means of a first membrane C for separating undissolved C02 bubbles from the liquid, by subsequently reducing the pressure of the liquid through a second membrane E, and by ejecting the beverage in a conical diverging stream.

8 Claims, 3 Drawing Sheets

(51) Int. Cl.
*B67D 1/12* (2006.01)
*B67D 1/07* (2006.01)

(52) U.S. Cl.
CPC ......... *B67D 1/0884* (2013.01); *B67D 1/1227* (2013.01); *B67D 1/07* (2013.01)

(58) Field of Classification Search
CPC .. B67D 1/0058; B67D 1/0059; B67D 1/1272; B67D 1/1422
See application file for complete search history.

(56) References Cited

U.S. PATENT DOCUMENTS

| | | | | |
|---|---|---|---|---|
| 3,456,839 A * | 7/1969 | Glisenti | ................ | A23G 9/282 222/638 |
| 5,062,548 A * | 11/1991 | Hedderick | ........... | B67D 1/1275 137/170.1 |
| 5,203,474 A * | 4/1993 | Haynes | ................ | B67D 1/0044 239/419 |
| 5,228,604 A * | 7/1993 | Zanini | ................... | B67C 3/281 222/509 |
| 5,368,205 A * | 11/1994 | Groh | ................... | B67D 1/0867 222/189.06 |
| 5,415,326 A * | 5/1995 | Durham | ................ | B67D 1/005 222/145.5 |
| 5,573,145 A * | 11/1996 | Groh | ................... | B67D 1/1466 222/400.7 |
| 5,601,210 A * | 2/1997 | Kelly | ................... | B67D 1/0047 222/509 |
| 6,019,257 A * | 2/2000 | Rasmussen | .......... | B67D 1/1466 222/400.7 |
| 6,230,767 B1 * | 5/2001 | Nelson | ................. | B67C 3/2608 141/264 |
| 6,443,335 B1 * | 9/2002 | Pinedjian | ............ | B67D 1/0861 141/2 |
| 6,564,971 B2 * | 5/2003 | Heyes | .................. | B01F 25/314 222/145.5 |
| 6,669,051 B1 * | 12/2003 | Phallen | ..................... | B67C 3/28 222/394 |
| 6,840,281 B1 * | 1/2005 | Amidzich | ................ | B67D 1/12 138/40 |
| 7,040,359 B2 * | 5/2006 | Younkle | ............... | B67D 1/1455 222/321.6 |
| 7,823,411 B2 * | 11/2010 | Gagliano | ............ | B67D 1/1438 62/390 |
| 9,033,315 B2 * | 5/2015 | Phillips | ................ | B01F 25/105 261/64.3 |
| 9,556,995 B2 * | 1/2017 | Selwyn | ................. | F16L 55/053 |
| 9,622,504 B2 * | 4/2017 | Lavaque | ........ | B01F 35/718051 |
| 10,155,650 B2 * | 12/2018 | Petermann | ........... | B67D 1/1272 |
| 10,308,494 B2 * | 6/2019 | Landman | ............ | B67D 1/1455 |
| 10,807,051 B2 * | 10/2020 | Hernan Blanco | .......................... | B01F 25/31242 |
| 11,166,584 B2 * | 11/2021 | Rege | ..................... | A47J 31/002 |
| 2005/0194399 A1 * | 9/2005 | Proctor | ............... | B67D 1/0881 222/1 |
| 2018/0280895 A1 * | 10/2018 | Hernan Blanco | ... | B01F 25/3121 |

OTHER PUBLICATIONS

Written Opinion mailed Jul. 19, 2021 for International application No. PCT/IB2021/052363.
International Preliminary Report on Patentability issued Sep. 22, 2022 for International application No. PCT/IB2021/052363.

* cited by examiner

BEVERAGE DISPENSER, BEVERAGE DISPENSING NOZZLE, AND BEVERAGE DISPENSING METHOD

RELATION OF THE PRESENT APPLICATION WITH OTHER PATENT DOCUMENTS OF THE SAME APPLICANT

The present application is related to document US 2018-0280895 A1 which discloses a mixing ring, system and method for dissolving a portion of a solute in a portion of a solvent. Additionally, the present application is also related to document U.S. Ser. No. 10/807,051 B2, which discloses a carbonation duct for blending a gas into a beverage and a carbonation process.

FIELD OF APPLICATION

The present invention is related to beverage serving technology. More specifically, the present application discloses a beverage serving method and serving machine, as well as a serving nozzle for said beverage serving machine. The serving method, machine and serving nozzle of the present application are intended for the use in the preparation and serving of soda beverages, although not limited thereto, as they offer the possibility of preparing and serving soda beverages, non-carbonated beverages, hot or cold beverages all in the same serving machine.

BACKGROUND OF THE INVENTION

Dispenser machines of the previous art base their functioning on a method that includes a first step of water carbonation with $CO_2$ and a later step of dissolving a concentrated flavored syrup on the stream of carbonated water. Said dissolution step is usually performed in a mixing device located in the serving nozzle of the dispenser machine immediately prior to the exit of the beverage stream from the dispenser machine and into the serving cup. As far as the current dispensers are concerned, they produce carbonated water that later, at the time a portion of beverage is served, incorporate the syrup which is mixed in the beverage. This causes all flavors to have the same volume of dissolved gas and part of the gas is lost when the syrup is incorporated.

A number of problems arise from the use of said beverage preparation method, the most important being the foaming produced during dissolution of the concentrated syrup in the stream of carbonated water. Said foaming problem derives in secondary problems such as the need to set lower limits in the flow rate of the beverage as a high flowrate would produce significant foaming with the risk of spillage of the beverage from the serving cup during dispensing of the beverage. Lower flow rates of the beverage stream impacts on the waiting time for the serving of the beverage, which is one of the main complaints of the users.

Additionally, foaming is also related to the viscosity of the concentrated syrup. A more concentrated syrup requires a more intense mixing during its dissolution in the carbonated water stream, which generates more intense foaming. On the other hand, a mild mixing during dissolution of the syrup results in heterogenic beverages with partially dissolved syrup, which greatly affects the final flavor. As a result, less concentrated syrups may be used, which has an impact on the volume of the dispenser machines, as a lower concentration of the syrup implies greater volume of syrup for the same number of servings. Additionally, serving a soda beverage into a glass or a cup in the traditional manner, wherein it flows down from the nozzle in a single stream causes the bubbles of the undissolved gas to link to each other generating a nucleation effect that accelerates the detachment of the gas from the beverage, which accelerates the foaming process.

A second common problem of the dispenser machines of the state of the art resides in the lack of an effective cleaning process for the internal piping between servings. As concentrated syrups used in the preparation have low pH values, they have a significant microbiological stability, which allows more flexible requirements regarding internal pipe cleaning. In practice, scheduled cleaning of the pipes is performed with a frequency sufficient to attend to the microbiological stability of the beverages. The cleaning of currently available dispenser machines is performed manually, and cleaning schedule programming is usually set by the operator in charge of its execution. At the same time, these dispenser machines are commonly used for the preparation of a number of different beverages, which requires the use of the mixing device located at the serving nozzle to dilute concentrated syrups of different flavors. Some of these concentrated syrups have a more intense flavor than others and the residual amount of syrup left on the serving nozzle after a serving may affect the flavor of the beverage selected for the next serving.

This is another common complaint of users of these dispenser machines. Thus, the scheduled cleaning of the internal piping commonly used in these dispenser machines, while frequent enough to guarantee microbiological innocuity, is not sufficient to attend to the problem of residual taste of the beverages.

Dispenser machines of the previous art cool carbonated water as it is accumulated in an internal reservoir of the dispenser machine. This causes difficulties in maintaining low temperatures in the cold water reservoir, as larger volumes are more difficult to cool homogenously. This is usually solved by adding ice to the beverage, which alters its flavor as the ice melts. Additionally, current dispenser machines include a manually controlled valve to set the syrup/water ratio used for preparing the beverage. This valve may be tampered with to lower syrup concentrations and syrup consumption at the expense of the quality of the beverage. As a result, beverages from currently available dispenser machines usually taste different than the industrial version of these beverages.

Document US 2018-0280895 A1 discloses a system and method for continuous dissolution of a solute in a solvent, which may be used in the production of a soda beverage at an industrial scale.

Document U.S. Ser. No. 10/807,051 B2 discloses a carbonation duct for blending a gas and a beverage, which may be used in the production of a soda beverage at an industrial scale.

The matter disclosed in both documents mentioned above may be combined into a soda beverage production line wherein the concentrated syrup is dissolved in water to produce a solution that is later carbonated, thereby attending to the problem of beverage foaming. However, neither of said documents disclose a method for producing a soda in individual serving portions. Additionally, at the industrial scale, the beverage stream is directed to a pressurized tank from which it is fed to filling machines. In this process, the beverage is not directed to a vessel that is open to the atmosphere at any time. The problem of foaming during the filling of an open vessel, wherein the problem is intensified, is not addressed in these documents.

BRIEF DESCRIPTION OF THE INVENTION

It is the purpose of the present invention to provide a solution to the aforementioned problems of the state of the art. With this purpose, a method that addresses the foaming problem related to the preparation of soda beverages and to the serving of said beverages in an open container is disclosed. Said method comprises at least the dissolution of a concentrated syrup on a cold-water stream in a mixing ring and at a desired syrup/water ratio, the subsequent carbonation of the dissolution in a carbonation ring at a desired gas/liquid ratio, and the serving of the carbonated beverage through a specially designed serving nozzle that reduces foaming during the serving.

Another aspect of the present invention discloses a serving nozzle for reducing the foaming of a carbonated beverage during the serving. Said serving nozzle comprises a phase separation chamber provided with a first membrane that allows the selective flow of a gas stream and a second membrane that allows the flow of a liquid stream. The combined effect of both membranes is to allow the separation of the non-dissolved gas from the carbonated beverage with the rapid decompression caused during aperture of the serving nozzle for serving the beverage and prior to exiting the serving nozzle. Additionally, the serving nozzle spouts the beverage in a stream with a conical shape, which taps on the walls of the glass during the serving, thereby generating a less intense nucleation effect and, consequently, a less intense foaming effect.

One further aspect of the present invention is a beverage serving machine. Said beverage serving machine comprises a mixing ring for dissolution of a stream of concentrated syrup coming from a syrup container in a stream of cold water coming from a cold-water tank. A pump located downstream of the mixing ring forces the flow of the resulting dissolution through a carbonation ring, wherein a $CO_2$ stream coming from a $CO_2$ storage tank is dissolved at a required gas/liquid ratio, and finally through a serving nozzle specially designed to reduce foaming during the serving.

BRIEF DESCRIPTION OF THE DRAWINGS

The present invention is illustrated in accordance with its preferred embodiment by means of the figures described below.

DETAILED DESCRIPTION OF THE INVENTION

The present application discloses a method, a machine and a nozzle for said machine, developed and configured for preparing a quantity of beverage suitable for or served to one person by formula. While said method, machine and nozzle are described throughout the application as used for the serving of a soda beverage, it should be understood that they are not limited thereto as any concentrated beverage may be used as a solute in the mixing ring and the level of carbonation of a beverage may be set to zero in the carbonation ring.

Figure 1:
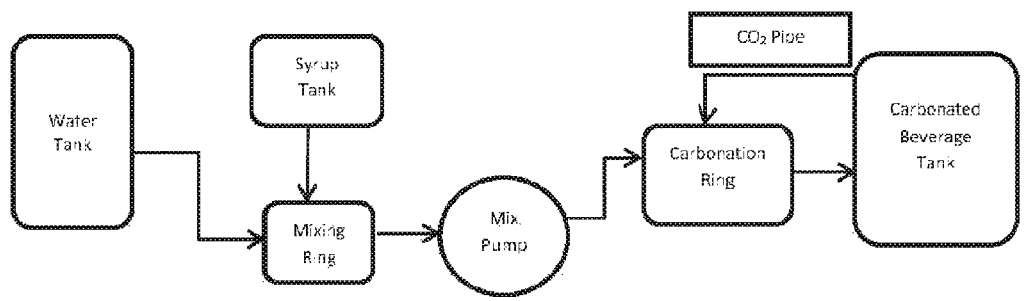
FIG. 1—shows a block diagram of a soda beverage production process at an industrial scale of the prior art.
Figure 2:
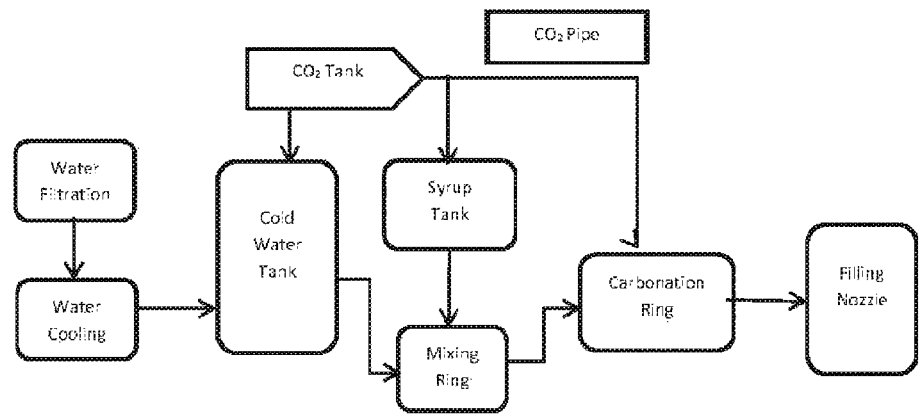
FIG. 2—shows a block diagram of the method for serving a beverage according to one aspect of the present invention.
Figure 3:
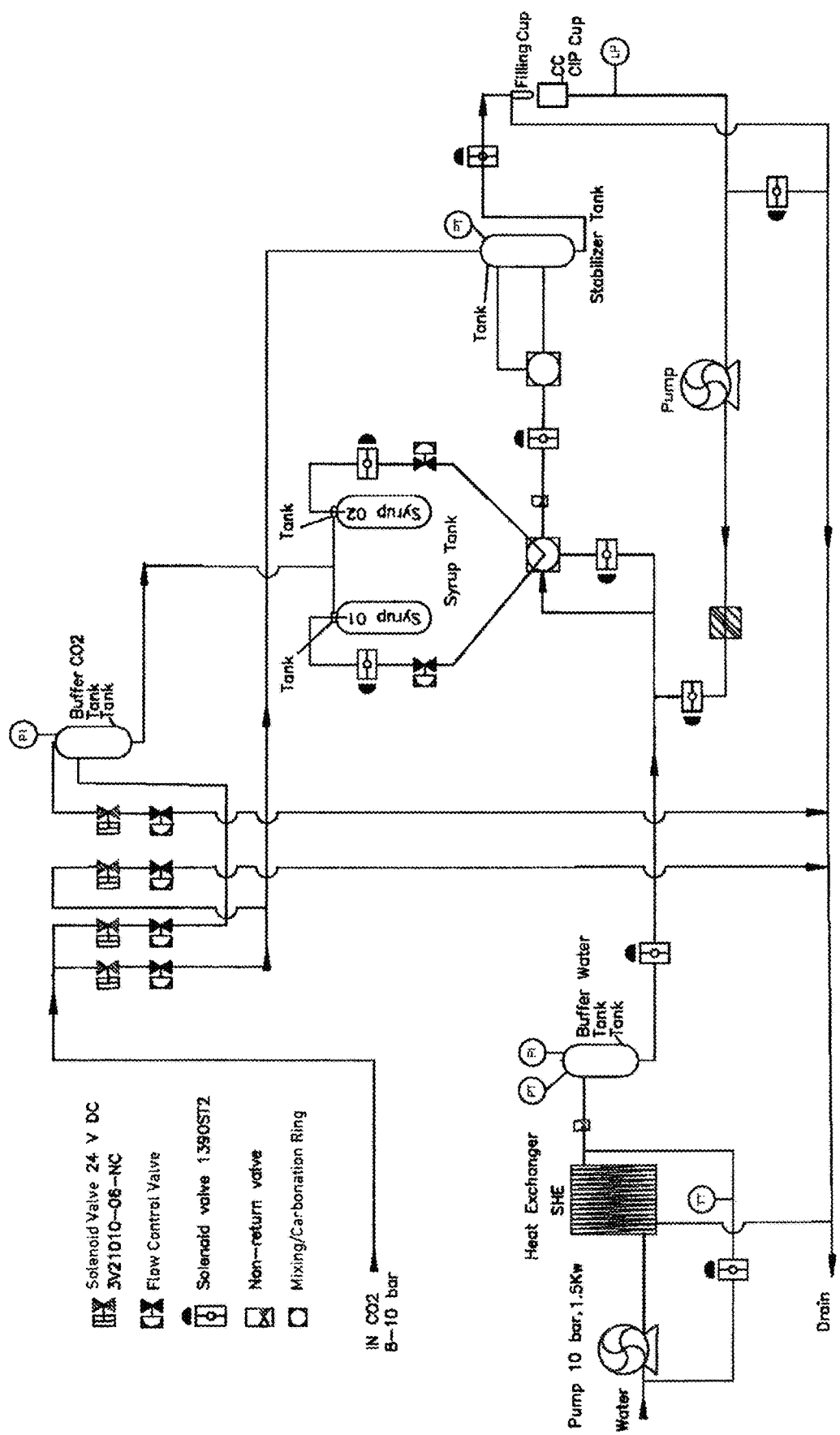
FIG. 3—shows a P&ID diagram of a beverage serving machine according to another aspect of the present invention.

FIGS. 2 and 3 show a block diagram of the method for serving a beverage and a P&ID diagram of the beverage serving machine of the present invention. A person having ordinary skills in the matter will recognize the steps of the method and parts of the serving machine that are related to each other. The following description will explain both aspects of the invention simultaneously.

The method for preparing and serving a soda beverage of the present invention starts with water entering the serving machine through a water inlet and flowing first through an activated carbon filter which retains impurities and chlorine. Subsequently, the stream of water is passed through a heat exchanger, which is responsible for lowering the temperature of the water to 4° C. and pumped by means of a high pressure pump into a cold water tank. The water tank is pressurized at 500 kPa (5 Bar, gauge pressure) by means of the high pressure pump.

Once the water tank has level and pressure, the glass/cup filling can be activated through the serving nozzle. Simultaneously whit the opening of the serving nozzle, a flush valve located downstream of the cold water tank is also opened. Upon said valve opening, the pressure in the beverage circuit decreases, thereby allowing the cold water to flow through the beverage circuit. In the beverage circuit, the water goes through the syrup mixing ring, where the syrup will be dosed by means of a ring intake valve. The syrup flow control is done by the frequencies of opening and closure of the valve (vibration by cycles). The higher the frequency, they higher the amount of dosed syrup. This way the quantity of syrup to be dosed into water can be controlled. The syrup is fed to the mixing ring by means of a syrup pipe coming from a syrup tank. Said syrup tank is pressurized with $CO_2$ at the same pressure as the cold water tank by means of a $CO_2$ pipe coming from a removable and refillable $CO_2$ tank. Additionally, up to five additional syrup lines coming from up to five similar syrup tanks can be fed into the same mixing ring, for a maximum of six syrup inlets in each mixing ring. Additionally, more than one mixing ring may be serially installed in the same beverage circuit, which makes it possible to increase the number of available flavors in the same beverage circuit as required.

Figure 4:
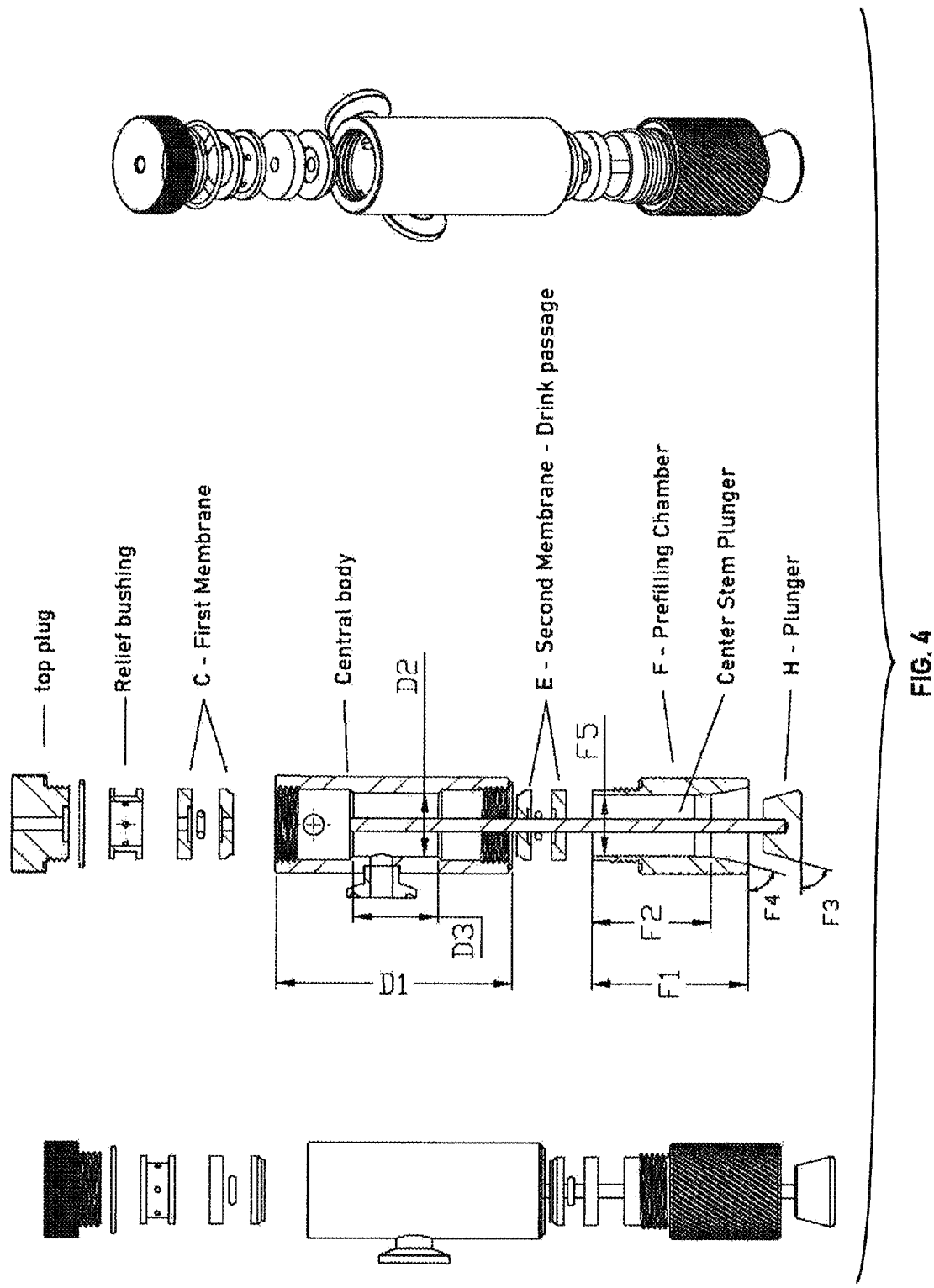
FIG. 4—shows an exploded view of the serving nozzle according to one further aspect of the present invention.

Once the water goes through the mixing ring and the syrup is dosed into the water as per the requested proportion, the already prepared beverage will continue to flow through the carbonation ring where it will incorporate the $CO_2$ with the same technique as the syrup valve. The $CO_2$ intake valve by means of its intermittence will control the amount of dissolved $CO_2$ in the beverage. The $CO_2$ is fed into the carbonation ring at a pressure of 90% of that of the cold water tank and is controlled through a valve that opens to allow entrance of $CO_2$ into the carbonation ring when the serving nozzle is opened. Additionally, the valve may be controlled to set a $CO_2$ pressure at a different level in order to control the carbonation level of the beverage. After going through the carbonation ring, the beverage will reach the serving nozzle, which is opened by a solenoid. The serving nozzle has a calibrated beverage passage that generates the progressive decompression of the beverage at the time of filling. When opened, the serving nozzle generates a conical passage, which spouts the beverage in a stream shaped as an inverted cup and makes the beverage tap around the internal circumference of the glass/cup, therefore diminishing foaming during filling. As the serving nozzle is opened, the water tank will be emptied, which will cause the system to automatically activate the inflow of cold water by means of the high pressure pump that takes water from the grid and into the system through the activated carbon filter. FIG. 4 shows an exploded view of the filling nozzle with references that can be followed to find dimension relations characteristic of the serving nozzle in the table below.

| Figure reference | Relationship/Criterion | Unit |
|---|---|---|
| D2 | Maximum beverage flow, divided by 10 will obtain the D2 in millimeters | Flow in Liters Measure in millimeters |
| D1 | D2 × 3.5 | millimeters |
| D3 | D2 × 1.3 | millimeters |
| F1 | D2 × 2.5 | millimeters |
| F2 | D2 × 2 | millimeters |
| F3 | 75° > F3 < 83° | degrees |
| F4 | F3 × 1.05 | degrees |
| F5 | Equal to D2 | millimeters |

The serving nozzle is also provided with automatically closing rinsing cup that covers the outlet of the serving nozzle and communicates the outlet of the serving nozzle to a rinsing water circuit configured for the disposal of rinsing water. Once the glass filling is finished and the rinsing cup is in the closed position (rinsing cup covering the serving nozzle), the rinsing system will be activated. The flush valve of the cold water tank will be opened simultaneously with the serving nozzle and a volume of approximately 200 $cm^3$ of water will be allowed to flow from the cold water tank through the beverage circuit. Said water will flow through the central channel of the mixing ring in the same fashion as when dissolving syrup in the water stream. However, syrup entrance into the mixing ring will be prevented by closing a valve located upstream of the mixing ring in each syrup line. The water will then flow through the carbonation ring in a similar manner and though the serving nozzle into the rinsing cup.

From the rinsing cup, the water will return to an internal vessel that allows the re-circulation of the water by means of a sanitizing pump. The return of the sanitizing water, before it enters the cleaning water recovery vessel, will go through a filter which retains the sugars and juices of the beverage, only returning the filtered water to the rinsing water recovery tank. This way and for two minutes, the rinsing water will recirculate to fully clean up the whole system. Once the cleaning of the system is complete, the excess waste rinsing water is sent to a pan for its evaporation. Optionally, this operation can also be done by adding a chemical for cleaning and later rinsing with water to eliminate impurities in the equipment. Also, this process may be performed in shorter periods of time, around five seconds, to clean the beverage circuit of syrup leftovers when the flavor is changed.

On a further aspect of the present invention, the serving nozzle has the main purpose of allowing the fast filling of a glass while minimizing the effect of foaming and $CO_2$ release in the serving of carbonated beverages. In the case of non-carbonated beverages, the main positive aspect are the sanitary and self-cleaning features. The secondary purpose of the serving nozzle is to level the pressure of the carbonation process, which is at least 300 kPa (3 Bar, gauge pressure) with the atmospheric pressure at the exit of the serving nozzle.

To avoid this problem and achieve these purposes, the valve has a phase separation chamber equipped with a first membrane C (FIG. 4) and a second membrane E. The first membrane C is a porous membrane manufactured with a selected pore size of 1 µm or less in order to only allow CO2 to pass through, while the second membrane E is a porous membrane selected with a pore size of 4 µm or more in order to allow the beverage to pass through and to cause a pressure drop of at least 150 kPa (1.5 Bar) in the beverage stream. This resistance offered by the second membrane E to the passage of the liquid allows the pressure drop when the beverage reaches the chamber to be gradual and, on the other hand, allows the undissolved gas to escape through the first or upper membrane C.

Once the beverage enters the phase separation chamber, it flows in the direction of the prefilling chamber E, where the beverage floods the chamber F to then circulate through the space that is generated between the valve plunger H and the conical wall (outlet of prefilling chamber) when the valve is opened. Said space generated between the plunger and the conical wall has a thickness of 0.3 mm (difference between the internal and external radius), which causes an additional pressure drop of approximately 50 kPa (0.5 Bar), allows the deacceleration of the fluid and conforms the cup shaped stream of the beverage that allows the filling of the glass by taping its walls.

The method, serving nozzle and beverage serving machine of the present application provide a number of advantages when compared to the prior art. For example, soda beverages are prepared following a process similar to that used in the production on industrial scale. This allows the preparation of a beverage with the same characteristics of the industrial beverage, both in terms of its mixing ratio and in flavor perception. Manual setting of the syrup/water ratio is eliminated, as is the possibility of undesired modifications of said syrup/water ratio. Also, as the water is cooled upon entry to the machine and only in the required volume, a better control of the temperature in the tank is achieved, reducing the need to use ice. Additionally, the foaming during serving is reduced, which reduces the time needed for the serving and the space required by the beverage serving machine, and the homogenic dissolution of the syrup in the beverage is ensured.

Another advantage of the present invention is related to the cleaning of the equipment. As the cleaning is performed automatically, manual cleaning of the internal parts is eliminated. Additionally, the automatic cleaning of the system provides the possibility of cleaning the beverage integration system when the selected flavor changes, thus eliminating residual taste in the following servings. Furthermore, the automatic proposed in the present application provides the possibility of sanitizing the serving nozzle internally, and of closing the cleaning cup to avoid entrance of external agents when the beverage serving machine is not in operation.

Optionally, a beverage serving machine according to the present invention may have more than one beverage circuit starting from the cold water tank, each finishing in a serving nozzle. Syrup concentration and carbonation level of the prepared beverage may be controlled independently in each circuit. Further, the carbonation level of the beverage may be adjusted in each serving of each serving nozzle. Simultaneous filling in all serving nozzles is also possible.

Also optionally, a beverage serving machine according to the present invention may comprise a weighting sensor located under each serving nozzle. The filling may start automatically when the weight of the glass is detected and finished when the weight reaches a predefined threshold. Additionally, it may be detected through said weighting when ice was previously added to the cup, and the ratio of syrup/water used in the mixing ring may be adjusted to compensate for the dilution resulting from ice melting.

One key aspect of a beverage serving machine according to the present invention is its mechanic simplicity and compacity. The beverage serving machine is designed as a modular equipment with a closed beverage circuit that does not require intervention for maintenance with cleaning purposes. Additionally, its installation is simple and does not require the installation of accessory equipment.

A beverage serving machine according to the present invention may be used to prepare both carbonated and non-carbonated beverages, as the pressure in the $CO_2$ inlet to the carbonation ring may be set to cero by closing a corresponding valve. Additionally, concentrated syrup or concentrated beverages to be dissolved in water may be provided in reusable kegs, which eliminates the waste generated by bagging boxes.

Further advantages may be obtained by using a mixing ring and a carbonation ring configured as scaled versions of the mixing device disclosed in US 2018-0280895 A1 and the carbonation device disclosed in U.S. Ser. No. 10/807,051 B2, respectively. A person having ordinary skills in the art may obtain a complete description of said elements in the aforementioned documents in order to correctly perform said scaling. However, it is possible to use any equivalent devices of the state of the art to perform an equivalent function without departing from the inventive concept of the present application.

It should be noted that the beverage serving machine of the present invention is intended to include internal logic circuitry configured to perform intelligent control of all process variables. However, since it is not the object of the present application to claim ownership over novel and inventive features of said circuitry, there is no need to describe it in this specification. It should be understood that the control of all the necessary variables will be carried out by means of circuitry configured in accordance with the state of the art.

What is claimed is:

1. A beverage serving machine that comprises:
   at least one beverage circuit, each of said at least one beverage circuit comprising:
      at least one mixing ring that comprises a central channel configured to receive a stream of water that flows through said central channel, and at least one solute inlet, communicatively coupled with said central channel, configured to receive a solute supply from a syrup line and to allow the introduction of said solute supply into the stream of water that flows through said central channel,
      a carbonation ring located downstream of said at least one mixing ring that comprises a central channel configured to receive a stream of a solution coming from the at least one mixing ring that flows through said central channel, and a $CO_2$ inlet communicatively coupled with said central channel, configured to receive a $CO_2$ supply from a $CO_2$ line and to allow the introduction of said $CO_2$ supply into the stream of solution that flows through said central channel of said carbonation ring,
      a serving nozzle that receives a prepared beverage coming from the carbonation ring and that comprises:
         a phase separation chamber equipped with a first membrane, which is a porous membrane with a pore size selected to selectively allow $CO_2$ to pass through, a second membrane, which is a porous membrane with a pore size selected to cause deceleration and pressure loss in the stream of prepared beverage flowing through the phase separation chamber, and
         a prefilling chamber disposed downstream of said second membrane of said phase separation chamber, and comprising a conical wall and a plunger, wherein said plunger is movable between an open and a closed position and wherein the conical wall and plunger are configured to, when said plunger is in the open position, spout the stream of prepared beverage out of the prefilling chamber in the shape an inverted cup,
   at least one solute line to supply the at least one mixing ring of the at least one beverage circuit with a stream of a solute, and comprising a solute tank and a valve configured to dose the quantity of solute that is to be dissolved in the stream of water that flows through the central channel of said at least one mixing ring,
   a $CO_2$ pipe to supply the carbonation ring of each at least one beverage circuit with $CO_2$, and comprising a valve configured to control the quantity of $CO_2$ introduced in the stream of solution that flows through the central channel of said carbonation ring of each of said at least one beverage circuit, and
   a $CO_2$ tank configured to supply each $CO_2$ pipe with $CO_2$.

2. A beverage serving machine according to claim 1, further comprising an inlet to receive a water stream that enters the serving machine, an activated carbon filter configured to retain impurities and chlorine, a high pressure pump, a heat exchanger configured to maintain the water stream at a selected temperature, a water tank and at least a flush valve configured to open simultaneously with the opening of a corresponding serving nozzle in order to allow a stream of water to pass from the water tank to a corresponding one of the at least one beverage circuits, wherein the high pressure pump is configured to maintain the pressure of the water tank at a selected value, and wherein the heat exchanger is located upstream of the water tank.

3. A beverage serving machine according to claim 1, wherein at least one solute tank is pressurized by means of a $CO_2$ supply coming from said $CO_2$ tank.

4. A beverage serving machine according to claim 1, further comprising a weight sensor located below the serving nozzle and configured to detect the weight of the cup or glass wherein the beverage is served.

5. A beverage serving machine according to claim 1, further comprising a rinsing system that comprises:
   at least a rinsing cup attached to a corresponding one of the at least one serving nozzle of the beverage serving machine, movable between an open and a closed position such that, when in the closed position, the outlet of the serving nozzle is covered by the rinsing cup, and communicatively coupled to a recirculating vessel located downstream of the rinsing cup within the rinsing system,
   a recirculating vessel located downstream of the at least one rinsing cup and configured to provide a stream of recirculating rinsing water to the at least one beverage circuit, a filter located between the at least one rinsing cup and the recirculating vessel and configured to retain sugars and juices contained in the rinsing water coming from the at least one rinsing cup,
   a sanitizing pump configured to impulse a stream of recirculating rinsing water from the recirculating vessel to the at least one beverage circuit, an evaporation tray configured to receive the rinsing water that is discarded once the rinsing process is finished.

6. A serving nozzle that comprises:

a phase separation chamber equipped with a first membrane, which is a porous membrane with a pore size selected to selectively allow $CO_2$ to pass through, a second membrane, which is a porous membrane with a pore size selected to cause deceleration and pressure loss in the stream of prepared beverage flowing through the phase separation chamber, and a prefilling chamber disposed downstream of said second membrane of said phase separation chamber, and comprising a conical wall and a plunger, wherein said plunger is movable between an open and a closed position and wherein the conical wall and plunger are configured to, when said plunger is in the open position, spout the stream of prepared beverage out of the prefilling chamber in the shape an inverted cup.

7. A serving nozzle according to claim 6, further comprising a closing cup movable between an open and a closed position and configured to be moved to the closed position in order to cover the outlet of the serving nozzle when said serving nozzle is not in operation.

8. A beverage serving method comprising the steps of:

preparing a solution by allowing water stream to flow through a central channel of at least one mixing ring while simultaneously allowing a solute stream to flow through a solute inlet of at least one mixing ring in order to be incorporated in the water stream flowing through said central vain at a desired solute/water ratio, carbonating the solution prepared in the previous step by allowing said solution to flow through the central channel of a carbonation ring while allowing a $CO_2$ stream to flow through a $CO_2$ inlet of the carbonation ring in order to be incorporated into the solution passing through said central channel at a desired gas/liquid ratio, allowing undissolved $CO_2$ to separate from the liquid stream in the phase separation chamber of a serving nozzle, while selectively allowing the separated $CO_2$ to pass through a first membrane of the phase separation chamber and the liquid to flow through a second membrane of the separation chamber to a prefilling chamber located downstream of said second membrane, thereby causing a pressure drop as well as a deceleration in the liquid stream, allowing the liquid stream to flow through a prefilling chamber comprising a conical wall and a plunger, thereby causing a further pressure drop in the liquid stream and spouting the liquid out of the serving nozzle in a stream with the shape of an inverted cup.

* * * * *